(12) United States Patent
Magzimof et al.

(10) Patent No.: US 11,618,439 B2
(45) Date of Patent: Apr. 4, 2023

(54) AUTOMATIC IMPOSITION OF VEHICLE SPEED RESTRICTIONS DEPENDING ON ROAD SITUATION ANALYSIS

(71) Applicant: Phantom Auto Inc., Mountain View, CA (US)

(72) Inventors: Shay Magzimof, Palo Alto, CA (US); David Parunakian, Moscow (RU); Vladimir Roumenov Glavtchev, Castro Valley, CA (US)

(73) Assignee: Phantom Auto Inc., Mountain View, CA (US)

( * ) Notice: Subject to any disclaimer, the term of this patent is extended or adjusted under 35 U.S.C. 154(b) by 132 days.

(21) Appl. No.: 16/845,059

(22) Filed: Apr. 9, 2020

(65) Prior Publication Data

US 2020/0324761 A1 Oct. 15, 2020

Related U.S. Application Data

(60) Provisional application No. 62/832,864, filed on Apr. 11, 2019.

(51) Int. Cl.
*B60W 30/09* (2012.01)
*G08G 1/052* (2006.01)
(Continued)

(52) U.S. Cl.
CPC .......... *B60W 30/09* (2013.01); *B60W 30/146* (2013.01); *B60W 30/162* (2013.01);
(Continued)

(58) Field of Classification Search
CPC ............. B60W 30/09; B60W 2520/10; B60W 2555/60; B60W 2556/45; B60W 2720/10;
(Continued)

(56) References Cited

U.S. PATENT DOCUMENTS 9,008,890 B1 * 4/2015 Herbach .............. G05D 1/0297
701/26
9,517,767 B1 * 12/2016 Kentley .................. B60R 21/01
(Continued)

FOREIGN PATENT DOCUMENTS

JP          4221840 B2 *  2/2009
WO    WO-2019023589 A1 *  1/2019 ............. G01C 21/20

OTHER PUBLICATIONS

U.S. Appl. No. 62/672,557, filed May 16, 2018 by Cheng et al. (Year: 2018).*

(Continued)

*Primary Examiner* — Donald J Wallace
*Assistant Examiner* — Daniel M. Robert
(74) *Attorney, Agent, or Firm* — Fenwick & West LLP

(57) ABSTRACT

In a vehicle teleoperation session, a speed limit is determined for which the vehicle can be safely teleoperated. A safety system senses data relating to the vehicle environment and generates a depth map from which obstacles in the vicinity of the vehicle can be identified. Based on the detected obstacles and a motion state of the vehicle, a speed limit is determined at which the teleoperator is predicted to be able to utilize an emergency braking command to avoid a collision. The speed limit may be automatically applied to the vehicle or may be provided to the teleoperator to enable the teleoperator to adjust the vehicle speed.

19 Claims, 5 Drawing Sheets

(51) Int. Cl.
  *B60W 30/14*    (2006.01)
  *B60W 30/16*    (2020.01)

(52) U.S. Cl.
  CPC ......... *G08G 1/052* (2013.01); *B60W 2520/10* (2013.01); *B60W 2555/60* (2020.02); *B60W 2556/45* (2020.02); *B60W 2720/10* (2013.01)

(58) Field of Classification Search
  CPC ........ G08G 1/052; G08G 1/164; G08G 1/165; G08G 1/166; G08G 1/096725; G05D 1/0011
  See application file for complete search history.

(56) References Cited

U.S. PATENT DOCUMENTS

| | | | | |
|---|---|---|---|---|
| 9,612,123 | B1* | 4/2017 | Levinson | G01C 21/32 |
| 10,663,977 | B2* | 5/2020 | Cheng | H04W 4/44 |
| 10,761,542 | B1* | 9/2020 | Fairfield | H04W 4/44 |
| 10,831,210 | B1* | 11/2020 | Kobilarov | B60W 60/0011 |
| 2007/0213883 | A1* | 9/2007 | Clarke | G08G 1/16 701/1 |
| 2012/0065861 | A1* | 3/2012 | Hartmann | B60T 8/17551 701/71 |
| 2012/0179349 | A1* | 7/2012 | Yamakado | B60W 10/184 701/89 |
| 2012/0271484 | A1* | 10/2012 | Feit | B60W 30/12 701/1 |
| 2013/0223686 | A1* | 8/2013 | Shimizu | G08G 1/166 382/103 |
| 2014/0324330 | A1* | 10/2014 | Minemura | G08G 1/16 701/301 |
| 2016/0133131 | A1* | 5/2016 | Grimm | G08G 1/096725 701/117 |
| 2017/0039855 | A1* | 2/2017 | Maeda | B60W 30/09 |
| 2017/0276494 | A1* | 9/2017 | Kusano | G01C 21/3415 |
| 2017/0341660 | A1* | 11/2017 | Jang | B60W 40/105 |
| 2017/0371345 | A1* | 12/2017 | Cohen | G06T 7/277 |
| 2018/0096605 | A1* | 4/2018 | Bai | G08G 1/166 |
| 2018/0286242 | A1* | 10/2018 | Talamonti | B60W 30/09 |
| 2018/0365908 | A1 | 12/2018 | Liu et al. | |
| 2019/0143974 | A1* | 5/2019 | Hoedt | B60W 30/10 701/23 |
| 2019/0258246 | A1 | 8/2019 | Liu et al. | |
| 2019/0318620 | A1* | 10/2019 | Yang | G08G 1/096708 |
| 2020/0164870 | A1* | 5/2020 | Takahashi | B60W 40/08 |
| 2020/0273197 | A1* | 8/2020 | Zhao | G01S 5/0263 |

OTHER PUBLICATIONS

Abe, M., "Vehicle Handling Dynamics: Theory and Application," Second Edition, ISBN: 978-0-08-100390-9, 2015, pp. 1-306.

Guiggiani, M., "The Science of Vehicle Dynamics: Handling, Braking, and Ride of Road and Race Cars," Second Edition, ISBN 978-3-319-73219-0, 2018, pp. 1-550.

Gupta, M. et al., "Structured Light in Sunlight," Proceedings of the 2013 IEEE International Conference on Computer Vision, Dec. 2013, pp. 545-552.

Jazar, R.N. et al., "Vehicle Dynamics: Theory and Application," Third Edition, ISBN 978-3-319-53440-4, 2017, pp. 1-985.

Kamalakkannan, B., "Modelling and Simulation of Vehicle Kinematics and Dynamics," Masters Thesis, May 2017, pp. 1-66.

Kim, K. et al., "Friction Coefficient of Emergency Braking on ABS and Non-ABS Car," Transactions of KSAE, vol. 16, No. 3, Jan. 2008, pp. 52-59 (with English abstract).

Knothe, K. et al., "Rail Vehicle Dynamics," ISBN 978-3-319-45374-3, 2003, pp. 1-321.

Popp, K. et al., "Ground Vehicle Dynamics," ISBN 978-3-540-24038-9, 2010, pp. 1-348.

Ren, X. et al., "Kinematics Model of Unmanned Driving Vehicle," Proceedings of the 8$^{th}$ World Congress on Intelligent Control and Automation, Jul. 2010, pp. 5910-5914.

Roggeman, H. et al., "Detection, Estimation and Avoidance of Mobile Objects Using Stereo-Vision and Model Predictive Control," 2017 IEEE International Conference on Computer Vision Workshops (ICCVW), Oct. 2017, pp. 2090-2099.

Schramm, D. et al., "Vehicle Dynamics: Modeling and Simulation," Second Edition, ISBN 978-3-662-54482-2, 2018, pp. 1-440.

Taghavifar, H. et al., "Off-road Vehicle Dynamics: Analysis, Modeling and Optimization," Studies in Systems, Decision and Control, vol. 70, ISBN 978-3-319-42519-1, 2017, pp. 1-183.

Ummenhofer, B. et al., "DeMoN: Depth and Motion Network for Learning Monocular Stereo," 2017 IEEE Conference on Computer Vision and Pattern Recognition (CVPR), Jul. 2017, pp. 5038-5047.

Yang, G. et al., "Truck acceleration behavior study and acceleration lane length recommendations for metered on-ramps," International Journal of Transportation Science and Technology, vol. 5, Sep. 30, 2016, pp. 93-102.

Yoon, J. et al., "Vehicle position estimation using nonlinear tire model for autonomous vehicle," Journal of Mechanical Science and Technology, vol. 30, No. 8, Aug. 19, 2016, pp. 3461-3468.

Zanuttigh, P. et al., "Operating Principles of Structured Light Depth Cameras," Chapter 2, Time-of-Flight and Structured Light Depth Cameras, May 25, 2016, pp. 43-79.

* cited by examiner

AUTOMATIC IMPOSITION OF VEHICLE SPEED RESTRICTIONS DEPENDING ON ROAD SITUATION ANALYSIS

CROSS-REFERENCE TO RELATED APPLICATIONS

This application claims the benefit of U.S. Provisional Patent Application No. 62/832,864, filed on Apr. 11, 2019, the contents of which are incorporated by reference herein.

BACKGROUND

Technical Field

This disclosure relates generally to teleoperated vehicles, and more specifically to methods of maintaining vehicle speed within desired limits.

Description of the Related Art

Despite the substantial progress made in the past decade, no fully autonomous vehicle technology currently exists. Moreover, it is not clear whether it makes practical sense to develop self-driving technology capable of correctly navigating all theoretically possible edge cases and rare hazardous situations, since currently available machine learning technologies heavily depend on the amount of available training data. In the absence of a large data set, reliability of machine learning technologies may be inadequate, while the development of a semantic artificial intelligence applicable to this task is a scientific problem that currently has no solution.

To resolve the issue of handling edge cases that cannot be correctly navigated by currently available and prospective machine intelligence agents, teleoperation of vehicles as an auxiliary technology is employed. According to this approach, whenever the confidence level of the machine intelligence agent controlling the vehicle declines past a certain threshold, or onboard sensors report abnormalities or certain events that require manual handling, the autonomous vehicle generates a request to be taken over by a remote human operator who then navigates the vehicle to safety using video feeds and sensor measurements provided by the vehicle. As soon as the onboard autonomous circuit or the remote operator determine that human agent intervention is no longer required, the teleoperation channel is usually terminated and the local machine intelligence agent continues navigating the vehicle to its destination. Alternatively, instead of a human teleoperator, the take-over request may be fulfilled by a more capable machine intelligence agent hosted on a cloud server.

However, there are certain complications arising from the fact that the intelligent transport system is controlled by a remote agent for some length of time. First of all, network disruption is always a risk even if the vehicle is equipped with multiple fallback communication systems. An abrupt termination of a remote control session or a number of other communication failure modes may lead to a situation where emergency braking is not sufficient to avoid a collision with an obstacle. Additionally, it has been shown in academic literature that due to differences of in situ perception of a regular three dimensional environment from a driver's seat in a vehicle and perception of an environment projected on displays of a teleoperator workstation, multiple factors arise that can alter perception of egocentric speed and distance to obstacles. This may in turn lead to critical errors of judgment of the teleoperator, causing the teleoperated vehicle to collide with an obstacle due to a miscalculation on the part of the remote operator.

SUMMARY OF THE EMBODIMENTS

A vehicle safety system imposes speed restrictions during a teleoperation session that enables safe teleoperation of the vehicle. The vehicle establishes a connection with a remote support server for enabling a teleoperation session in which the vehicle is controlled by a remote teleoperator. The vehicle receives, during the teleoperation system, control signals from the remote support server for controlling motion of the vehicle. A safety system obtains a depth map indicative of respective distances to objects in an environment of the vehicle. The safety system determines, based on the depth map, obstacles in the environment of the vehicle. The safety system receives sensor data from a sensor array indicative of a vehicle motion state and determines, based on the vehicle motion state and the one or more obstacles, a speed limit for limiting speed of the vehicle during the teleoperation session that enables safe teleoperation of the vehicle. The safety system determines if the vehicle is operating above the speed limit, and initiates a remedial action responsive to the vehicle operating above the speed limit. The remedial action may include sending a notification to the remote support server or automatically imposing speed constraints on the vehicle.

DETAILED DESCRIPTION

In a vehicle teleoperation session, a speed limit is determined for which the vehicle can be safely teleoperated. A safety system senses data relating to the vehicle environment and generates a depth map from which obstacles in the vicinity of the vehicle can be identified. Based on the detected obstacles and a motion state of the vehicle, a speed limit is determined at which the vehicle is predicted to be able to implement emergency braking command (e.g., directly by the vehicle or by the teleoperator) to avoid a collision. The speed limit may be automatically applied to the vehicle or may be provided to the teleoperator to enable the teleoperator to adjust the vehicle speed. Thus, the vehicle system may maintain restrictions on vehicle kinematics to give the emergency braking subsystem sufficient time to react to prevent a collision in response to the teleoperator initiating an emergency braking command or automatically in response to a disruption in control or communications with the teleoperator.

Figure 1:
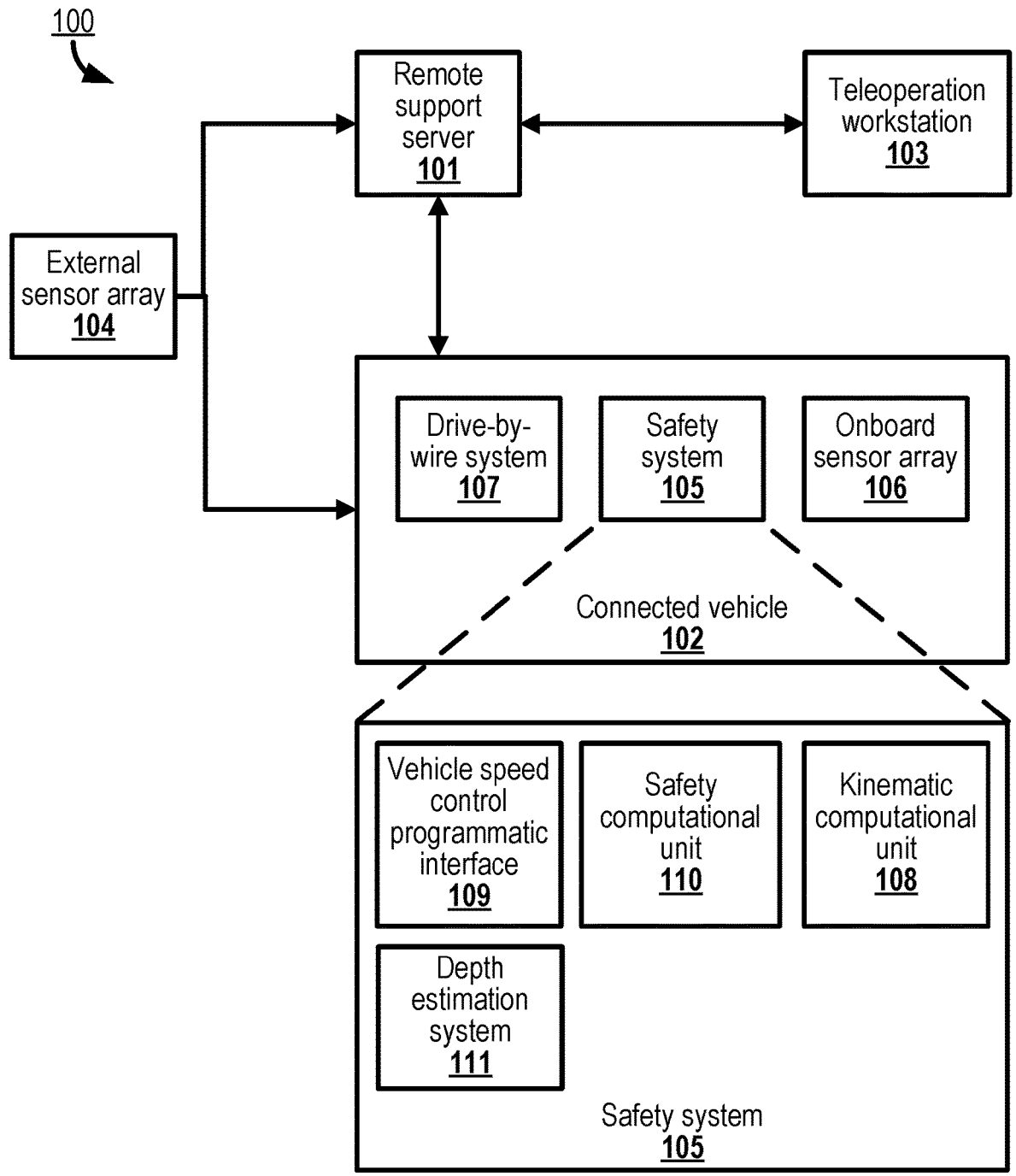
FIG. 1 is a block diagram of teleoperated vehicle environment.

FIG. 1 illustrates an example embodiment of an environment 100 for teleoperating a vehicle. A remote support server 101 communicates with one or more connected vehicles 102 to provide teleoperation or other support services. In an embodiment, upon establishing a remote support session with a vehicle 102, a video stream capturing a vehicle environment is provided to the remote support server 101. The video stream may optionally be presented at a teleoperation workstation 103 for a human teleoperator. Furthermore, other sensor data or video streams may be provided from the vehicle 102 or external sensor arrays 104 to the remote support server 101. In this embodiment, a human teleoperator at the teleoperation workstation 103 may view the video stream on a display and provide control inputs via a control input device. The remote support server 101 may present the video in real-time and provide real-time teleoperation control signals to control the vehicle 102 to enable the teleoperator to remotely drive the vehicle.

In another embodiment, the remote support server 101 may comprise an artificial intelligence agent that does not necessarily require a teleoperator workstation 103 with a display or physical controls for providing human input. Here, the remote support server 101 may provide control instructions to the vehicle directly based on the processing of a real-time video feed and other sensor data without necessarily utilizing any human input. In alternative embodiments, the remote support server 101 may comprise a semi-robotic agent that interacts with a teleoperator workstation 103 in a similar manner as a human teleoperator.

The teleoperator workstation 103, if present, may be coupled to the remote support server 101 via a local area network connection, a direct wired connection, or via a remote connection. A teleoperator workstation 103 may include a display to enable a human teleoperator to view real-time video of the vehicle environment and controls for enabling a human teleoperator to control the vehicle. In an embodiment, the video may include at least a front view that mimics or approximates the view seen by a driver within the vehicle. Optionally, the video may include additional views, such as a rear view video, side view videos, or other views that may mimic the views seen by a driver in mirrors of a traditional vehicle or may include other views not necessarily available to a driver of a traditional vehicle. The controls may include controls that mimic those available within a traditional vehicle such as a steering wheel, acceleration pedal, and brake pedal. Alternatively, different forms of controls may be available at the teleoperator workstation 103 such as a joystick, mouse, touch screen, voice control system, gesture control system, or other input mechanism to control one or more aspects of the vehicle.

In other embodiments, where the remote support server 101 operates entirely as an artificial intelligence agent without human intervention, the teleoperator workstation 103 may be omitted.

The connected vehicle 102 comprises a vehicle safety system 105, a plurality of sensor arrays 106 (such as LIDAR, radar, sonar, or stereo cameras), and a drive-by-wire system 107. Other components of the vehicle 102 such as a communication system for wireless communicating with the remote support server 101 or external sensor arrays 104 and an on-board computer for linking and controlling various components of the connected vehicle 102 are omitted from FIG. 1 for conciseness. In an embodiment, implementation of one or more components of FIG. 1 may include a processor and a non-transitory computer-readable storage medium that stores instructions for carrying out the functions attributed to the various components described herein.

The drive-by-wire system 107 receives control signals from the remote support server 101 and controls operation of the vehicle 102 in response to the control signals to enable teleoperation of the vehicle 102. For example, the drive-by-wire system 107 may receive steering control signals, braking control signals, acceleration control signals, or other vehicle control signals to control operation of the vehicle 102 when being teleoperated. The drive-by-wire system 107 may furthermore provide sensor data to the remote support server 101 to enable the remote support server 101 to generate the control signals in response to the sensed information (either based on human teleoperator controls or from an artificial intelligence agent). In an embodiment, the drive-by-wire system 107 may furthermore control certain actions directly based on received sensor data and/or data from the safety system 105, without necessarily requiring control signals from the remote support server 101.

The onboard sensor array 106 includes one or more sets of sensors for capturing information about the vehicle operation and/or the vehicle environment. The sensors may include, for example, one or more cameras for capturing images or video, an inertial measurement unit (IMU) for capturing motion data of the vehicle, a global navigation satellite system (GNSS) for capturing position data relating to the vehicle, a computational unit such as Doppler analysis unit or tire modelling unit to determine operating characteristics of the vehicle, or other sensing systems. The onboard sensor array 106 may furthermore comprise a network interface for receiving data from external data sources (e.g., Internet-based sources) that provide data such as current air humidity, estimates of moisture condensed on the road surface, or other information. In an embodiment, the onboard sensor array 106 furthermore includes a time-of-flight ranging device such as pulse or continuous-wave LIDAR, radar, or sonar to perform depth estimation.

The safety system 105 generates a set of safety parameters based on sensed information that may be utilized by the drive-by-wire system 107 directly or may be sent to the remote support server 101 to assist in teleoperation of the vehicle 102. In an embodiment, the safety system 105 periodically requests a data set from one or more data sources that includes information relevant to safely navigating the vehicle 102. Responsive to receiving a data set from a source, the system 105 determines kinematic parameters such as vehicle steering angle, speed, and trajectory in substantially real time, and stores these or other parameters in transient or permanent storage onboard the connected vehicle 102. In other instances, the system may request data sets episodically or under certain circumstances, or utilize other mechanisms for data consumption such as publish-subscribe or push-pull.

The safety system 105 may include a kinematic computational unit (KCU) 108, a vehicle speed control programmatic interface 109, a safety computational unit 110, and a depth estimation system 111.

The depth estimation system 111 provides depth estimates for objects present in the video feed captured by the onboard sensor array 106 (or external sensor array 104) and generates a depth map representing respective distances to detected objects. For example, the depth map may comprise an array of pixels or blocks of pixels associated with an image in which a depth of each pixel or block of pixels represents a distance to the nearest object depicted at that location. In alternative embodiments, the depth map may comprise a three-dimensional array indicating whether or not an object is detected at each three-dimensional location within a volume. In an embodiment, the depth map may represent a volume in a vicinity of the vehicle 102. In other embodiments, the depth map may be limited to locations that intersect a predicted trajectory of the vehicle 102 over a certain time range. Discrete regions of the depth map that intersect the predicted trajectory of the vehicle 102 represent obstacles. Depending on the environment and the trajectory of a vehicle 102, such obstacles may include other vehicles, pedestrians, light poles or building facades.

The depth estimation system 111 may comprise, for example, a structured light depth camera suitable for outdoors environment mapping based on any appropriate coding scheme, such as sinusoidal, binary or de Brujin coding. In one embodiment, the structured light camera uses a narrow-band light source and a narrow-band filter to remain functional in sunlight. In another embodiment, the structured light camera uses a polarized light source and a polarization filter to remain functional in sunlight. In another embodiment, the structured light camera uses light concentration techniques to sequentially illuminate and scan the complete angular range while reducing the time required to achieve the necessary signal-to-noise ratio at each step.

Alternatively, or in addition, the depth estimation system 111 may comprise an artificial neural depth estimator that includes a monocular camera and an appropriately trained machine learning (ML) system executed on an onboard computer such as a convolutional neural network (CNN). The ML system performs depth estimation for each frame captured by the camera. In a further embodiment, the ML system may additionally be trained to use the motion parallax effect to recover a depth map.

In an embodiment, the depth estimation system 111 receives stereo images from a stereo vision camera and estimates a depth map based on stereo disparity using state of the art computer vision (CV) methods. In an embodiment, the depth estimation system 111 does not necessarily include a dedicated camera and may estimate the depth map from images and/or video received from cameras of the onboard sensor array 106 and/or external array 104.

The kinematic computational unit (KCU) 108 generates predictions about a time until the vehicle 102 will collide with an object absent some remedial action, based on the current vehicle state, object states, and sensed environmental conditions. For example, in an embodiment, the KCU 108 receives various kinematic parameters (e.g., position, speed, acceleration, vehicle trajectory, etc.) of the vehicle, a depth map representing distances to detected objects in a vicinity of the vehicle 102, and time information from a system clock running with a certain degree of granularity. Based on the received information, the KCU 108 updates an estimate of the time until a collision of the vehicle 102 following the current trajectory with an obstacle, provided that a set of assumptions on the behavior of the environment is valid. These estimates may be made available to other components of the vehicle safety system 105 or may be made available to other vehicles 102 in the vicinity. For example, the time to collision may be provided via a dedicated programmatic interface or transmitted over a wireless network for consumption by remote operation software.

The vehicle speed control programmatic interface (VSCPI) 109 generates control signals for manipulating the speed of the vehicle 102 in response to various safety considerations. The VSCPI 109 may directly control speed (e.g., through interaction with the drive-by-wire system 107) or via may control speed indirectly via a related variable such as engine power or torque. The VSCPI 109 may be accessed by other components of the vehicle 102 via a dedicated programmatic interface to enable the other components to provide data for controlling speed of the vehicle 102. Additionally, the VSCPI 109 may be accessible by the remote support server 101 via a wireless network.

The safety computational unit (SCU) 110 restricts the speed of the vehicle 102 using the VSCPI 109 in such a manner that the estimated time to collision computed by the KCU 108 exceeds the sum of the estimated remote operator reaction time and the braking time as computed using an appropriate method. The SCU 110 may be permanently active, or activate responsive to certain conditions being met, or activate responsive to signals emitted by other vehicle 102 components.

In an embodiment, the SCU 110 maintains a record of the velocity V and the steering angle ϕ of the vehicle 102 using data from the onboard sensor array 106, commands from the drive-by-wire system 107, or other information sources. In an embodiment, the system 105 additionally maintains a record of the expected vehicle 102 acceleration and steering angle derivative using methods such as differentiation of the velocity V and the steering angle ϕ time profiles, analysis of the profile of drive-by-wire commands received by the vehicle 102, or other methods.

The SCU 110 may be designed to limit the speed in a manner that enables the vehicle to be decelerated in time to avoid a collision in response to an emergency braking signal from a teleoperator. In another embodiment, the SCU 110 may be configured to automatically decelerate the vehicle as an automatic precaution in the event that the vehicle loses a connection to the remote support server during a teleoperation session. Here, the speed limit may be set in a manner that enables the SCU 110 to bring the vehicle to a stop and avoid a collision in response to detecting the loss of the connection.

In alternative embodiments, the safety system 105 may be implemented wholly or partly on a computing system external to the vehicle 102. For example, the safety system 105 or components thereof may be implemented on the remote support server 101, on a fleet management that manages a fleet of vehicles, or on another network device.

Figure 2:
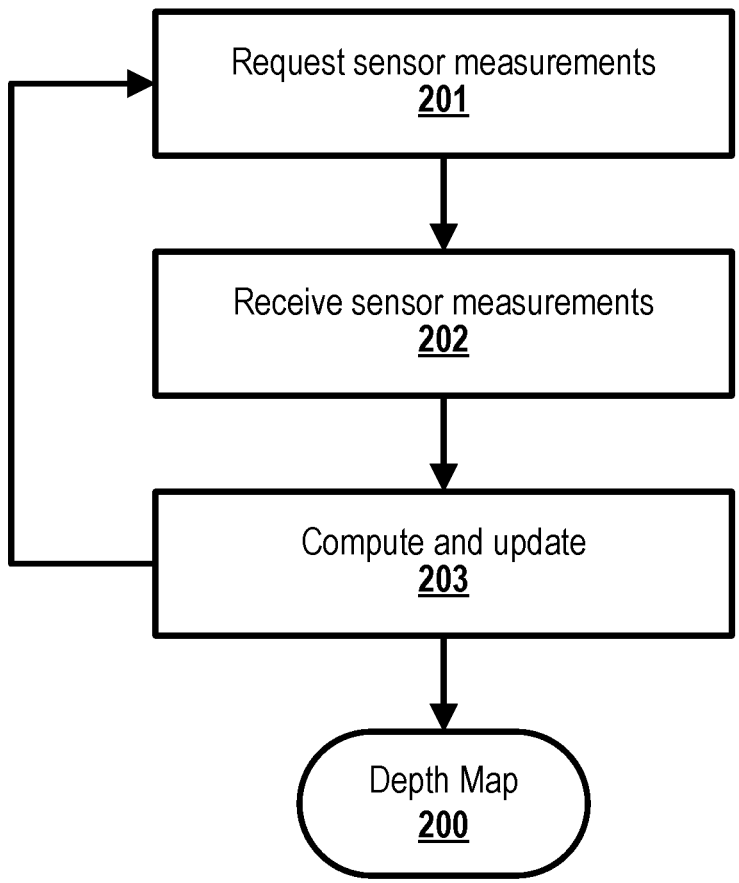
FIG. 2 is a flowchart illustrating a method for building and maintaining a depth map.

FIG. 2 is a flowchart illustrating an embodiment of a method for building and maintaining a depth map 200. The safety system 105 requests 201 a data set of sensor measurements. The safety system 105 may request the data from the onboard sensor arrays 106, the external sensors 104, other vehicles 102, or a combination thereof. The sensor data may be requested on a periodic basis or in response to some event. Alternatively, sensor data may be pushed to the safety system 105 without an explicit request. The safety system 105 receives 202 a sensor data set responsive to the request. Responsive to receiving 202 the data set, the safety system 105 computes and updates 203 a depth map 200 representing distances to objects detected in the environment of the vehicle 102. The depth map 200 may comprise, for each of a plurality of detected points in a vicinity of the vehicle 102, a distance parameter representing a distance between the vehicle 102 and the object, and an angle parameter representing an angle between the vehicle 102 and the object. In an embodiment, the depth map 200 may be generated over sufficient angular dimensions dependent on the specific environmental factors. Furthermore, in an embodiment, the depth map 200 may be generated or updated in substantially real time (e.g., using a request-reply mechanism). In other instances, the safety system 105 may request data sets episodically or under certain circumstances, or utilize other mechanisms for data consumption such as publish-subscribe or push-pull.

Figure 3:
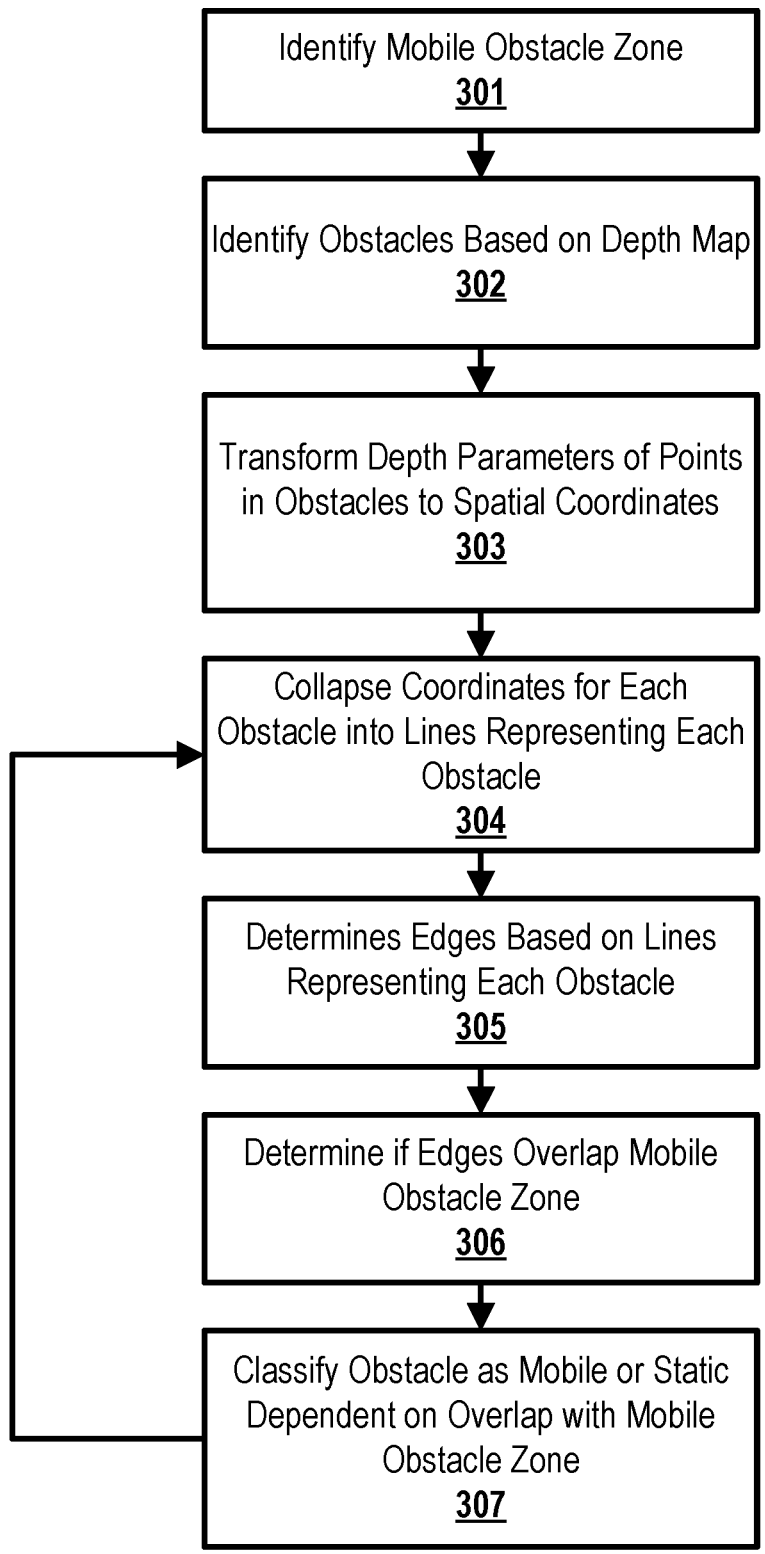
FIG. 3 is a flowchart illustrating a method for discriminating between mobile and static obstacles.

FIG. 3 is a flowchart illustrating an example embodiment of a process for classifying obstacles detected in the depth map 200 as either mobile obstacles or static obstacles. In this embodiment, the safety system 105 classifies obstacles as mobile obstacles (e.g., likely to correspond to other vehicles) if they lie within a mobile obstacle zone representing an area within a threshold lateral distance from the vehicle 102. Otherwise, the safety system 105 classifies obstacles as static obstacles if they lie outside of the mobile obstacle zone (beyond the threshold lateral distance from the vehicle 102).

In the example process, the safety system 105 computes 301 edges of the mobile obstacle zone based on the information on the lane occupied by the vehicle 102 (which may be obtained based on prestored map data, real-time sensor data, or a combination thereof), the position of the vehicle 102 within that lane, and the layout of the road network in the immediate vicinity of the vehicle 102. The safety system 105 identifies 302 discrete obstacles as clusters of adjacent points P={i ∈{1,2, ... , n}|p$_i$} in the depth map 200. Clusters may be identified using any suitable clustering algorithm. For each of the points in a cluster corresponding to an obstacle, the safety system 105 transforms 303 the depth map data (which includes, for each point, an angle and distance from the vehicle 102 to the object) to a set of spatial coordinates (e.g., an x-y-z location). Here, the X axis is directed parallel to the symmetry axis of the vehicle 102 (for example, coinciding with the direction of the lane), the Y axis is directed normally clockwise from the positive direction of the X axis, and the Z axis completes the left-handed set. In an example, the z=0 level may be chosen in a manner so that the ranging device onboard the vehicle 102 lies in the XY plane. For each point in the depth map 200, the safety system 105 determines the (x, y) coordinate pairs by multiplying the measured depth associated with each point by the sine and cosine of the angle α between the X axis and the projection of the direction to the point on the XY plane, and determines a z coordinate by multiplying the cosine of the angle β between the X axis and the projection of the direction to the point on the XZ plane.

The system 105 then collapses 304 the points P of each obstacle 300 into a linear form corresponding to the surface closest to the vehicle 102:

$$P' = \{i \in \{1, 2, \ldots, n\} \big| \left(\min_{i \in \{1,2,\ldots,n\}} p_{ix}, p_{iy}\right)\}.$$

For example, a leading vehicle in front of the vehicle 102 may be represented as a line approximating the surface location of its rear bumper, while a trailing vehicle behind the vehicle 102 may be represented as a line approximating the surface location of its front bumper. The safety system 105 then determines 305 the locations of the lateral edges of each obstacle. For example, the safety system 105 determines the values of the outermost coordinates of the linear form:

$$y_{min} = \min_{i \in \{1,2,\ldots,n\}} p_{iy}, \quad y_{max} = \max_{i \in \{1,2,\ldots n\}} p_{iy}$$

for each obstacle 300. The safety system 105 determines 306 whether the outer edges overlap the mobile obstacle zone. For example, the safety system 105 determines whether the $y_{min}$ is higher than the current left edge of the mobile obstacle zone and whether the $y_{max}$ is lower than the current right edge of the mobile obstacle zone. The safety system 105 then classifies 307 each obstacle as either mobile or static dependent on the overlap with the mobile obstacle zone. For example, if either of the above described overlap conditions are met, the safety system 105 classifies the obstacle as a mobile obstacle. Otherwise, the safety system 105 classifies the obstacle as a static obstacle. Steps 304, 305, 306, 307 may repeat for each detected obstacle.

In an embodiment, the system 105 may perform additional analysis for obstacles in the static zone (outside the mobile obstacle zone) to predict a likelihood of them entering the mobile obstacle zone within a relevant time interval.

In an embodiment, the safety system 105 may determine static obstacle zone geometry using data acquired from external data sources such as aerial or satellite imagery, cadaster records, or interfaces provided by public agencies or corporate entities.

In an embodiment, the system safety 105 may use the time profile of the position of a mobile obstacle $m_i$ relative to the vehicle 102 to determine its velocity $v_i$ relative to the ground, heading angle $\theta_i$ and steering angle $\phi_i$. The safety system 105 may further use the information on dynamics of mobile obstacles during simulations to compute the position and heading of a mobile obstacle $\{x_i(t), y_i(t), \theta_i(t)\}$, which in conjunction with the known geometric size of a mobile obstacle may be used by the safety system 105 to determine bounding boxes around each mobile obstacle. The bounding boxes may be utilized to more accurately track locations of the mobile obstacles and predict collisions.

Figure 4:
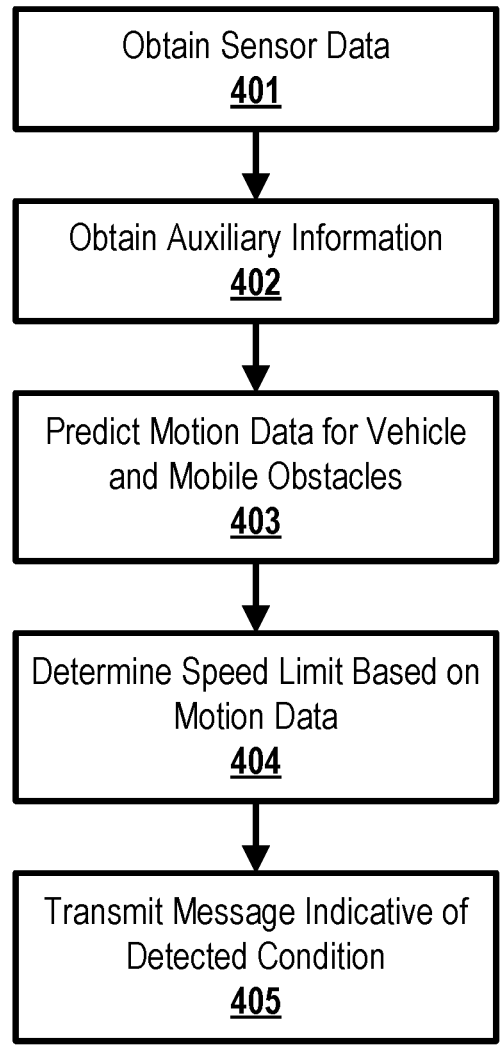
FIG. 4 is a flowchart illustrating a method for evaluating vehicle speed safety.

FIG. 4 illustrates an example embodiment of a method for evaluating vehicle speed of teleoperated vehicles to determine speed limits for operating the vehicles 102. Here, the KSU 108 may perform kinematic simulations of the vehicle 102 and its environment for multiple time points $t_j \in [0, T]$ along the predicted vehicle 102 trajectory in the following manner. The KSU 108 may first obtain 401 sensor data. The sensor data may include information from a local sensor array 106 comprising sensors such as IMU, GPS, Doppler effect sensors or other devices as described above. Additionally, sensor data may be obtained from an external sensor array 104. In an embodiment, the KSU 108 may also additionally obtain 402 auxiliary information such as pending but non-executed remote operator commands, transmissions from neighboring vehicles 102 over vehicular ad-hoc networks or over wireless infrastructure that may influence the solution but is not reflected in currently observable kinematics. The KSU 108 then predicts 403 motion of the vehicle 102 and the detected mobile obstacles. For example, the KSU 108 may analytically or numerically solve a motion equation for the vehicle 102 and the set of known mobile obstacles 300 M={k ∈{1,2, ... , K}|m$_i$}, that predicts the values for vehicle and mobile obstacle positions and orientations for all the desired time points $\tau_j$. The KSU 108 may adjust the interval between time points $\tau_j$ responsive to changes in parameters describing the vehicle 102 such as onboard computer performance. The KSU 108 determines 404 a speed limit based on the motion data. Here, the KSU 108 may detect the maximum speed at which the vehicle 102 can travel at a given time during a teleoperation session that will enable an emergency braking command to stop the vehicle in sufficient time to avoid a collision under the present conditions. In an embodiment, the speed limit may be based on a time to bring the vehicle to a stop in response to an emergency braking signal from a teleoperator. In another embodiment, the speed limit may be based on a time to bring the vehicle to a step as an automatic precaution in the event that the vehicle loses a connection to the remote support server during a teleoperation session.

The speed limit may vary dependent on the conditions and may be dynamically updated over time during the teleoperation session. For example, the speed limit may decrease on more congested roadways or on roadways with a greater number of obstacles. Additionally, the speed limit may adjust dependent on whether the vehicle is being teleoperated by a human or computer agent, or may adjust dependent on varying profiles of different human operators and their respective reaction times. Further still, the speed limit may adjust dependent on current network conditions to account for varying latency that may be introduced in the time it takes for video or other sensor data to reach the teleoperator and/or the time it takes for teleoperation commands to be received and executed by the vehicle 102.

In an embodiment, the KSU 108 determines the speed limit by performing simulations of the vehicle 102 trajectory and speed under the assumption that a malfunction occurs at a given time point τ. The KSU 108 may then determine whether at the speed the vehicle 102 is estimated to travel at that time τ, a collision of the vehicle 102 with an obstacle may occur before the vehicle 102 comes to a complete halt if an emergency slowdown command is initiated at that time. In an embodiment, the system 105 represents the time ΔT allocated for emergency slowdown based at least in part on a time period $\Delta t_b$ representing the practical deceleration capacity of the vehicle 102, which in turn may depend on ABS availability, humidity of the road surface, tire model and other physical factors. Additionally, the safety system 105 may furthermore determine the time ΔT based at least in part on a predefined cooldown period $\Delta t_c$. Here, the cooldown period $\Delta t_c$ may represent a preconfigured delay value that may be set by teleoperation administrator or adjusted automatically. Adjusting the cooldown period $\Delta t_c$ enables calibration of the false positive rate. For example, setting a higher cooldown period $\Delta t_c$ increases the predicted time to a collision and thus may decrease the likelihood of determining that a slowdown or emergency action is needed. Setting a lower cooldown period $\Delta t_c$ decreases the predicted time to a collision and thus may increase the likelihood of determining that a slowdown or emergency action is needed. The cooldown period $\Delta t_c$ may be helpful to calibrate the time ΔT allocated for emergency slowdown based on a predicted likelihood that a critical ingress communication channel such as the command and control link with the remote teleoperator or machine intelligence agent becomes severed or malfunctions.

In another embodiment, the time ΔT is based at least in part on a remote operator reaction time $\Delta t_r$. The reaction time may be determined based on, for example, the camera exposure time, video frame onboard processing time, video frame transmission time $$\Delta t_{n1} = \frac{\tau_{rtt}}{2} + \frac{8S}{1000 \cdot BW}$$

(where $\tau_{rtt}$ is the estimate of the network round trip time between the vehicle 102 and the teleoperation workstation 103, S is the frame size in bytes and BW is the estimated network throughput in megabits per second), the video frame remote processing time (which may in turn include a safety margin of $$\frac{1}{F},$$

where F is the teleoperation workstation 103 monitor refresh rate in Hz if the remote operator is an agent consuming the video feed via a visual display or a plurality thereof), estimated remote operator reaction time $\Delta t_{react}$, and the control message transmission time $\Delta t_{n2}$ determined similarly to $\Delta t_{n1}$. For example, the safety system 105 may use the remote operator reaction time $\Delta t_{react}$ in scenarios where a malfunction of a critical egress communication channel such as the video feed link or relevant hardware implements is detected. In an embodiment, the KSU 108 determines the maximum speed at which a collision can be avoided if emergency braking is initiated at the time point max(τ+$\Delta t_{react}$, τ+$\Delta t_c$). Here, τ+$\Delta t_{react}$ represents the earliest time that the remote server 101 can initiate an emergency brake, while τ+$\Delta t_c$ represents a configurable waiting time based on the cooldown period $\Delta t_c$. Thus, if the safety system 105 determines to initiate an emergency braking but the command does not arrive within the time window τ+$\Delta t_c$, the KSU 108 can determine that the network communication or remote teleoperator is malfunctioning.

The KSU 108 may then transmits 405 a message indicative of the detected condition. Here, the message may specify the determined speed limit itself and/or may comprise an indicator indicating whether or not the vehicle 102 is exceeding the speed limit. For example, the KSU 108 may publish a message to the controlling agent (e.g., the remote support server 101 or SCU 110) indicating that the selected speed profile may be hazardous or make this information available to other components of the safety system 105.

In an embodiment, the remote support server 101 may provide an indicator on the teleoperation workstation 103 that alerts a human teleoperator to the speed limit (or an indicator indicating when the teleoperated vehicle 102 is exceeding the speed limit) to enable the human teleoperator to optionally decrease the vehicle speed. For example, the speed indicator may be displayed as an overlaid element on the video or may be provided via an audible alert. In another embodiment, the KSU 108 may transmit the information describing the vehicle's 102 estimated future trajectory and estimated safe stopping distance to the human agent at the teleoperator workstation 103. For example, the teleoperator workstation 103 may use this information for the purpose of augmenting the visual representation displayed to the operator. For example, the estimated vehicle 102 trajectory may include the predicted arc or path the vehicle is estimated to traverse in the near future, including some uncertainty or estimated error, and the estimated safe braking distance required to altogether avoid or minimize the impact of a collision. The estimated trajectory information may be based on the current input to the vehicle control system by either the devices capturing the operator's input or the onboard autonomous circuit. The teleoperator workstation 103 may present the estimated trajectory and braking distance information to the operator as an augmented reality (AR) overlay on top of a monoscopic or stereoscopic video presentation layer.

In an embodiment, the vehicle 102 that is exceeding the determined speed limit may automatically adjust its speed to speed limit. Alternatively, the remote support server 101 may automatically send a control signal to adjust the vehicle's speed 102. In another embodiment, the SCU 110 may automatically adjust the vehicle speed only in the case that the remote operator has been observed to disregard warning messages.

In an embodiment, the safety system 105 performs the kinematic simulations under the assumption that the onboard computer only manipulates vehicle 102 speed v in an emergency slowdown mode and that the steering angle ϕ is static, enabling the reduction of the time necessary for computing the solution and keeping the trajectory of a malfunctioning vehicle 102 predictable for agents controlling other vehicles 102.

In an embodiment, the KSU 108 may compute and publish information describing a set of possible trajectories based on the vehicle's 102 current telemetry information (such as its velocity v or steering angle φ). For example, the elements in the set of possible trajectories may each be classified as paths which would completely avoid a collision with any obstacle 300, paths which would minimize the impact of a collision with an obstacle 300, and paths which would result in a maximum-impact collision. The teleoperator workstation 103 may display each path to the operator in a color-coded or otherwise differentiated representation in order to provide the operator with sufficient information to make a decision regarding the trajectory to pursue. The teleoperator workstation 103 may present the calculated path information to the operator as an augmented reality (AR) overlay on top of a monoscopic or stereoscopic video presentation layer.

In an embodiment, the teleoperator workstation 103 may provide the remote with a user interface component or application programming interface endpoint to override the decision of the SCU 111 regarding vehicle 102 speed limit adjustment. For example, such an embodiment may be used in case of sensor malfunction or data set processing errors.

Figure 5:
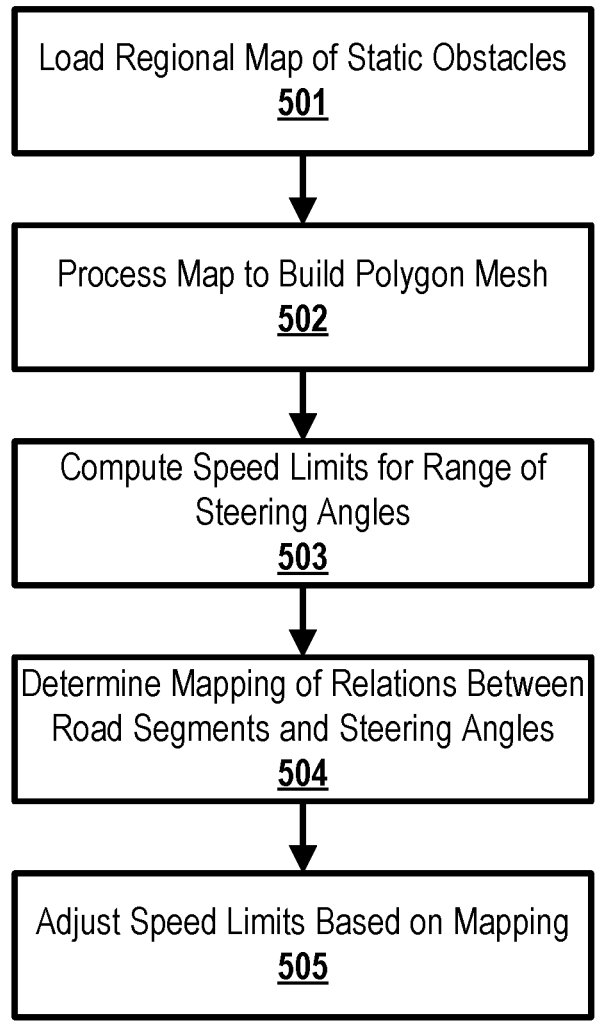
FIG. 5 is a flowchart illustrating a method for constructing a map of safe vehicle speeds.

FIG. 5 is an example embodiment of a process for precomputing speed limits for a teleoperated vehicle at a remote support server 101. This process enables the safety system 105 to request a pre-computed maximum vehicle speed limit data set from the remote support server 101 and use it to reduce the computational requirements of the KSU 108. An example procedure of constructing such a data set may be employed as follows. The remote support server 101 loads 501 a regional map of static obstacles such as buildings, road edges, light pole positions or other types of objects to be avoided. The remote support server 101 then processes 502 the map to identify the surfaces of the road network in that region and build a polygon mesh, with each polygon corresponding to a discrete segment of the road network. The remote support server 101 then computes 503 an array of maximum allowed vehicle speed values using analytical calculations or numerical simulations for the entire range of possible steering angle values for each such road segment. The speed limit for a given road segment and steering angle may represent the maximum speed at which a vehicle traversing that road segment and being operating at the given steering angle can be decelerated by a teleoperator in sufficient time to avoid colliding with a static obstacle. At the next stage, the remote support server 101 determines 504 a mapping of relations between individual road segments and steering angles. In other words, it establishes that applying a steering angle $\phi_0$ while traversing the road segment $s_n$ the vehicle 102 will travel to the road segment $s_m=S(n, \phi_0)$. The remote support server 101 may then adjust the determined speed limits based on the mapping between road segments and steering angles. For example, the remote support server 101 may determine 505 for each $(s_n,s_m)$ tuple representing adjacent road segments, whether the difference between the maximum allowed vehicle 102 speed values for these segments $v_n-v_m$ exceeds a threshold difference (based on, for example, the braking capabilities of the vehicle or other factors) as previously determined from the path and time available for the transition between the segments. If the difference between speed limits exceeds the threshold difference, the remote support server 101 may further adjusts $v_n$ to ensure a smooth transition between subsequent segments.

In an embodiment, the remote support server 101 may provide the safety system 105 with a data set that includes speed limit information computed accounting for mobile obstacles moving along some trajectories and at some speeds relative to the vehicle 102. Such a data set may be comprehensive or restricted to a range of scenarios previously requested by the safety system 105, or restricted to a range of scenarios determined as probable to be encountered during the current trip by the remote server 101.

In an embodiment, the remote support server 101 may provide the safety system 105 with a data set including manually or automatically pre-labeled geoinformation on hazardous areas. Such a data set may be solely defined by geographic coordinates of the vehicle 102 or any landmarks involved, geographic coordinates in conjunction with temporal intervals, or custom semantic rulesets.

In another embodiment, the remote support server 101 may provide the safety system 105 with a data set based in part on information obtained by analyzing speed limits observed by in situ human drivers or remote vehicle operators. This may allow to account for factors that are not reliably identified by machine learning algorithms but are identified by human agents with a sufficient degree of accuracy.

In another embodiment, the remote support server 101 may provide the safety system 105 with a data set including information on weather conditions and derivative parameters. For example, the data set may include information on expected air humidity and temperature levels, and based on these characteristics the onboard computer may compute the probability and severity of fog condensation, which may in turn be used in maximum permitted speed calculations.

In another embodiment, the remote support server 101 may provide the safety system 105 with a data set accounting for specific vehicle model, road surface humidity level, absence or presence of an ABS system, total load of the vehicle or other parameters.

In another embodiment, the remote support server 101 may provide the safety system 105 with an updated data set episodically, periodically, according to a schedule or in substantial real time. Such updates may each comprise a full dataset package, a cumulative incremental package or a differential incremental package.

In another embodiment, the safety system 105 computes paths on the road network that are optimal according to a specific cost function as well as satisfy the safety conditions.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the scope of the embodiments.

The invention claimed is:

1. A method for operating a vehicle comprising:
    establishing, by a vehicle, a connection with a remote support server for enabling a teleoperation session in which the vehicle is controlled by a remote teleoperator;
    receiving during the teleoperation session, control signals from the remote support server for controlling motion of the vehicle;
    obtaining a depth map indicative of respective distances to objects in an environment of the vehicle;
    identifying a mobile obstacle zone based on lane boundaries associated with a vehicle trajectory;
    identifying clusters of adjacent points in the depth map;
    collapsing the clusters into obstacles;
    determining based on coordinates of the clusters, whether the obstacles are within the mobile obstacle zone;
    classifying at least a first obstacle as a mobile obstacle responsive to determining that the first obstacle is within the mobile obstacle zone;
    classifying at least a second obstacle as a static obstacle responsive to determining that the second obstacle is outside the mobile obstacle zone;
    receiving sensor data from a sensor array indicative of a vehicle motion state;
    obtaining network latency information indicative of latency introduced under detected or predicted network conditions that affects a time for the sensor data to be transmitted to the remote support server and for the control signals to be transmitted from the remote support server to the vehicle during the teleoperation session;

obtaining, from the remote support server, an array of precomputed speed limits, the array comprising, for each of a plurality of road segments, a set of speed limits corresponding to respective steering angles across a range of steering angles;

determining, based on the vehicle motion state, the network latency information, the array of precomputed speed limits, and a set of obstacles including the mobile obstacle and the static obstacle, a speed limit for limiting speed of the vehicle during the teleoperation session that enables safe teleoperation of the vehicle when traversing the plurality of road segments;

determining if the vehicle is operating above the speed limit; and initiating a remedial action responsive to the vehicle operating above the speed limit.

2. The method of claim 1, wherein initiating the remedial action comprises:
sending a notification to the remote support server indicating that the vehicle is exceeding the speed limit.

3. The method of claim 1, wherein initiating the remedial action comprises:
determining, based on the vehicle motion state and the set of obstacles, a range of vehicle kinematic parameters that can be applied to avoid a collision with the set of obstacles; and
providing the range to the remote support server to enable the remote support server to generate a representation of the range of vehicle kinematic parameters on a display of a workstation operated by the remote teleoperator.

4. The method of claim 1, wherein initiating the remedial action comprises:
automatically limiting the speed of the vehicle to the speed limit.

5. The method of claim 1, wherein obtaining the depth map comprises:
obtaining sensing data from the sensor array representing an environment of the vehicle; and
generating the depth map based on the sensing data.

6. The method of claim 1, wherein determining the speed limit comprises:
modeling a trajectory of the vehicle at a sequence of time points based on the sensor data;
modeling positions of the obstacles at each of the time points; and
determining the speed limit in part based on the modeled trajectory of the vehicle and the modeled positions of the set of obstacles at each of the time points.

7. The method of claim 1,
wherein determining the speed limit comprises modeling at least one of:
a deceleration time of the vehicle;
an estimated reaction time of the remote teleoperator; and
a cooldown period.

8. The method of claim 7, wherein modeling the estimated reaction time of the remote teleoperator comprises:
modeling at least one of a camera exposure time, a video frame onboard processing time, a video frame transmission time, and an estimated human teleoperator response time.

9. A method for precomputing speed limits for operating a vehicle during a teleoperation session, the method comprising:
obtaining, by a remote support server, a regional map of an area of the vehicle;
modeling road segments of the regional map including positions of obstacles;
obtaining network latency information indicative of latency introduced under detected or predicted network conditions that affects a time for sensor data to be transmitted to the remote support server and for control signals to be transmitted from the remote support server to the vehicle;
generating, based at least in part on the network latency information and modeled vehicle kinematics, an array of initial vehicle speed limits for each of the road segments over a range of steering angles, the initial vehicle speed limits representing a speed at which the vehicle traversing a given road segment at a given steering angle can be decelerated in time to avoid a collision with the obstacles in response to an emergency braking command from a teleoperator;
determining respective mappings of the steering angles for traveling between pairs of connected road segments;
generating an adjusted array of vehicle speed limits by determining for each of the pairs of the connected road segments, whether a difference between the initial vehicle speed limits exceeds a deceleration limit, and responsive to the difference between the initial vehicle speed limits exceeding the deceleration limit in a given pair of road connected segments, adjusting a speed limit for a first road segment of the given pair of connected road segments to a slower speed limit; and
providing the adjusted array of vehicle speed limits to the vehicle.

10. A non-transitory computer-readable storage medium storing instructions for operating a vehicle, the instructions when executed by a processor causing the processor to perform steps including:
establishing, by a vehicle, a connection with a remote support server for enabling a teleoperation session in which the vehicle is controlled by a remote teleoperator;
receiving during the teleoperation session, control signals from the remote support server for controlling motion of the vehicle;
obtaining a depth map indicative of respective distances to objects in an environment of the vehicle;
identifying a mobile obstacle zone based on lane boundaries associated with a vehicle trajectory;
identifying clusters of adjacent points in the depth map;
collapsing the clusters into obstacles;
determining based on coordinates of the clusters, whether the obstacles are within the mobile obstacle zone;
classifying at least a first obstacle as a mobile obstacle responsive to determining that the first obstacle is within the mobile obstacle zone;
classifying at least a second obstacle as a static obstacle responsive to determining that the second obstacle is outside the mobile obstacle zone;
receiving sensor data from a sensor array indicative of a vehicle motion state;
obtaining network latency information indicative of latency introduced under detected or predicted network conditions that affects a time for the sensor data to be transmitted to the remote support server and for the control signals to be transmitted from the remote support server to the vehicle during the teleoperation session;

obtaining, from the remote support server, an array of precomputed speed limits, the array comprising, for each of a plurality of road segments, a set of speed limits corresponding to respective steering angles across a range of steering angles;

determining, based on the vehicle motion state, the network latency information, the array of precomputed speed limits, and a set of obstacles including the mobile obstacle and the static obstacle, a speed limit for limiting speed of the vehicle during the teleoperation session that enables safe teleoperation of the vehicle when traversing the plurality of road segments;

determining if the vehicle is operating above the speed limit; and initiating a remedial action responsive to the vehicle operating above the speed limit.

11. The non-transitory computer-readable storage medium of claim 10, wherein initiating the remedial action comprises:

sending a notification to the remote support server indicating that the vehicle is exceeding the speed limit.

12. The non-transitory computer-readable storage medium of claim 10, wherein initiating the remedial action comprises:

determining, based on the vehicle motion state and the set of obstacles, a range of vehicle kinematic parameters that can be applied to avoid a collision with the set of obstacles; and providing the range to the remote support server to enable the remote support server to generate a representation of the range of vehicle kinematic parameters on a display of a workstation operated by the remote teleoperator.

13. The non-transitory computer-readable storage medium of claim 10, wherein initiating the remedial action comprises:

automatically limiting the speed of the vehicle to the speed limit.

14. The non-transitory computer-readable storage medium of claim 10, wherein obtaining the depth map comprises:

obtaining sensing data from the sensor array representing an environment of the vehicle; and generating the depth map based on the sensing data.

15. The non-transitory computer-readable storage medium of claim 10, wherein determining the speed limit comprises:

modeling a trajectory of the vehicle at a sequence of time points based on the sensor data;

modeling positions of the obstacles at each of the time points; and determining the speed limit in part based on the modeled trajectory of the vehicle and the modeled positions of the set of obstacles at each of the time points.

16. The non-transitory computer-readable storage medium of claim 10, wherein determining the speed limit comprises modeling at least one of:

a deceleration time of the vehicle;

an estimated reaction time of the remote teleoperator; and a cooldown period.

17. The non-transitory computer-readable storage medium of claim 16, wherein modeling the estimated reaction time of the remote teleoperator comprises:

modeling at least one of a camera exposure time, a video frame onboard processing time, a video frame transmission time, and an estimated human teleoperator response time.

18. The non-transitory computer-readable storage medium of claim 10, wherein determining the speed limit comprises:

obtaining, from the remote support server, an array of precomputed speed limits across a range of steering angles for each of a plurality of road segments; and determining the speed limit based at least in part on the precomputed speed limits.

19. A non-transitory computer-readable storage medium storing instructions for precomputing speed limits for operating a vehicle during a teleoperation session, the instructions when executed by a processor causing the processor to perform steps including:

obtaining, by a remote support server, a regional map of an area of the vehicle;

modeling road segments of the regional map including positions of obstacles;

obtaining network latency information indicative of latency introduced under detected or predicted network conditions that affects a time for sensor data to be transmitted to the remote support server and for control signals to be transmitted from the remote support server to the vehicle;

generating, based at least in part on the network latency information and modeled vehicle kinematics, an array of initial vehicle speed limits for each of the road segments over a range of steering angles, the initial vehicle speed limits representing a speed at which the vehicle traversing a given road segment at a given steering angle can be decelerated in time to avoid a collision with the obstacles in response to an emergency braking command from a teleoperator;

determining respective mappings of the steering angles for traveling between pairs of connected road segments;

generating an adjusted array of vehicle speed limits by determining for each of the pairs of the connected road segments, whether a difference between the initial vehicle speed limits exceeds a deceleration limit, and responsive to the difference between the initial vehicle speed limits exceeding the deceleration limit in a given pair of connected road segments, adjusting a speed limit for a first road segment of the given pair of connected road segments to a slower speed limit; and providing the adjusted array of vehicle speed limits to the vehicle.

* * * * *